United States Patent
Ibrahim et al.

(10) Patent No.: US 12,420,268 B1
(45) Date of Patent: Sep. 23, 2025

(54) HYDROGEN GENERATION METHOD USING SODIUM BOROHYDRIDE

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Babiker yagoub Elhadi Abdulkhair, Riyadh (SA); Mohamed Khairy Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/214,668

(22) Filed: May 21, 2025

(51) Int. Cl.
*B01J 27/24* (2006.01)
*B01J 21/06* (2006.01)
(Continued)

(52) U.S. Cl.
CPC ............ *B01J 27/24* (2013.01); *B01J 21/066* (2013.01); *B01J 23/02* (2013.01); *B01J 35/45* (2024.01);
(Continued)

(58) Field of Classification Search
None
See application file for complete search history.

(56) References Cited

U.S. PATENT DOCUMENTS

| | | |
|---|---|---|
| 2001/0022960 A1 | 9/2001 | Kojima et al. |
| 2015/0017084 A1 | 1/2015 | Zhang et al. |

FOREIGN PATENT DOCUMENTS

| | | | | |
|---|---|---|---|---|
| CN | 113856735 A | * | 12/2021 | ............ B01J 37/08 |
| IN | 202341053723 A | | 9/2023 | |

OTHER PUBLICATIONS

Ucar Kaya et al ("Preparation and characterization of RhFe/g-C3N4 nanoparticles for efficient hydrolysis of sodium borohydride", Turkish J. Chem. 2025, vol. 49(1), p. 68 which was published online Nov. 12, 2024) (Year: 2024).*

(Continued)

*Primary Examiner* — Michael Forrest
(74) *Attorney, Agent, or Firm* — Oblon, McClelland, Maier &Neustadt, L.L.P.

(57) ABSTRACT

A method of hydrogen generation from sodium borohydride ($NaBH_4$) using zirconium dioxide/calcium silicate/graphitic carbon nitride ($ZrO_2/CaSiO_3/g\text{-}C_3N_4$) based nanocomposite includes hydrolyzing $NaBH_4$ in the presence of a $ZrO_2/CaSiO_3/g\text{-}C_3N_4$ nanocomposite material, where the $NaBH_4$ reacts with water to form hydrogen ($H_2$) gas in the presence of the $ZrO_2/CaSiO_3/g\text{-}C_3N_4$ nanocomposite material as a catalyst. Further, the $ZrO_2/CaSiO_3/g\text{-}C_3N_4$ nanocomposite material includes spherical metal oxide nanoparticles including a $ZrO_2$ phase and a $CaSiO_3$ phase dispersed on a matrix of $g\text{-}C_3N_4$ nanosheets, where the spherical metal oxide nanoparticles have an average particle diameter in a range from 3 to 18 nm. Still further, the hydrolyzing proceeds with a hydrogen generation rate of greater than or equal to 200 $mL \cdot min^{-1} \cdot g^{-1}$.

20 Claims, 6 Drawing Sheets

(51) Int. Cl.
  *B01J 23/02*  (2006.01)
  *B01J 35/45*  (2024.01)
  *B01J 35/51*  (2024.01)
  *B01J 35/61*  (2024.01)
  *B01J 35/63*  (2024.01)
  *B01J 35/66*  (2024.01)
  *B01J 37/04*  (2006.01)
  *B01J 37/34*  (2006.01)
  *C01B 3/06*  (2006.01)
  *C01B 21/06*  (2006.01)
  *C01B 33/24*  (2006.01)
  *C01G 25/02*  (2006.01)

(52) U.S. Cl.
  CPC .............. *B01J 35/51* (2024.01); *B01J 35/613* (2024.01); *B01J 35/633* (2024.01); *B01J 35/695* (2024.01); *B01J 37/04* (2013.01); *B01J 37/343* (2013.01); *C01B 3/065* (2013.01); *C01B 21/0605* (2013.01); *C01B 33/24* (2013.01); *C01G 25/02* (2013.01); *C01P 2002/72* (2013.01); *C01P 2004/04* (2013.01)

(56) References Cited

OTHER PUBLICATIONS

Machine Translation of CN113856735 (Year: 2021).*
Jian Ren, et al., "Hydrogen generation from hydrolysis of NaBH4 solution with efficient g-C3N4/Co—Mo—B/Ni foam catalyst", International Journal of Hydrogen Energy, vol. 50, Part D, Sep. 24, 2023, pp. 1213-1222, Excerpts only, 5 pages.
U. B. Demirci, et al., "Promoted sulphated-zirconia catalysed hydrolysis of sodium tetrahydroborate", Catalysis Communications, vol. 9, Issue 6, Oct. 30, 2007, pp. 1167-1172.

* cited by examiner

HYDROGEN GENERATION METHOD USING SODIUM BOROHYDRIDE

BACKGROUND

Technical Field

The present disclosure is directed towards a hydrogen generation method, and, more particularly, towards a nanocomposite material including $ZrO_2$, $CaSiO_3$, and $g-C_3N_4$ for hydrogen generation using sodium borohydride.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The rapid depletion of fossil fuel sources and a notable increase in atmospheric carbon dioxide ($CO_2$) emissions result from growing energy demands of modern society. Many people believe switching to renewable energy sources from nonrenewable ones, such as fossil fuels, is a practical way to lessen the energy crisis. To promote a more sustainable and ecologically friendly future, such a change attempts to lessen our need for carbon-intensive fossil fuels. This could eliminate all carbon emissions at the point of use, which may help with various environmental issues, like pollution and global warming. Thus, the improvement of clean energy advances sustainable development. Because of its high energy density of 142 megajoule per kilogram (MJ $kg^{-1}$), non-toxicity, and environmental friendliness, hydrogen ($H_2$) has emerged as one of the most striking energy carriers among renewable sources. In addition, energy density of the $H_2$ (142 MJ/kg) is higher than that of liquid hydrocarbons, which have an energy density of 47 MJ/kg. $H_2$ may generally be kept in carbon-based materials as molecules, metal hydrides as atoms, in pressure vessels, and liquid hydrogen tanks. High-pressure hydrogen storage and liquefaction present several challenges that hinder the widespread implementation. One of the primary disadvantages is the high investment and maintenance costs required for the infrastructure, such as specialized high-strength cylinders designed to store $H_2$ at pressures up to 700 bar. These cylinders, often made of expensive materials like carbon fibre, are costly to produce and maintain. Additionally, the energy consumption associated with compressing $H_2$ to high pressures is substantial, as it requires large amounts of electricity to achieve the required compression, which adds to the operational costs. Furthermore, maintaining $H_2$ at high pressure increases the risk of gas leakage, posing both safety and efficiency concerns, as $H_2$ is highly flammable and may easily escape even with smallest defects in the storage system. Similarly, liquefaction of hydrogen, which involves cooling it to cryogenic temperatures around $-253°$ C., requires energy input and specialized equipment to prevent boil-off, making the process both expensive and energy-intensive.

On the other hand, metal hydrides offer an alternative method for $H_2$ storage, but they come with its own set of limitations. While metal hydrides may absorb $H_2$ at lower pressures, the process of $H_2$ release requires elevated temperatures (often over 200° C.) to break the $H_2$-metal bond, making it inefficient for many applications. For example, the alloy lanthanum-nickel hydride ($LaNi_5$) may store $H_2$ effectively but requires heating to release the gas, consuming additional energy. Moreover, many metal hydrides are sensitive to air and moisture, which may degrade the performance and stability. The air sensitivity, along with the elevated temperature requirements for $H_2$ release, may limit the practical use as $H_2$ storage materials, including in applications where efficiency, safety, and cost are paramount.

Each of the aforementioned $H_2$ storage processes suffer from one or more drawbacks hindering their adoption. Accordingly, one object of the present disclosure to provide methods and systems for $H_2$ storage that may circumvent the drawbacks, such as, high energy consumption, high investment, high-cost factor, of the materials known in the art.

SUMMARY

In an exemplary embodiment, a method of hydrogen ($H_2$) generation from sodium borohydride ($NaBH_4$) using zirconium dioxide/calcium silicate/graphitic carbon nitride ($ZrO_2/CaSiO_3/g-C_3N_4$) based nanocomposite is described. The method includes hydrolyzing $NaBH_4$ in the presence of a $ZrO_2/CaSiO_3/g-C_3N_4$ nanocomposite material, where the $NaBH_4$ reacts with water to form $H_2$ gas in the presence of the $ZrO_2/CaSiO_3/g-C_3N_4$ nanocomposite material as a catalyst. Further, the $ZrO_2/CaSiO_3/g-C_3N_4$ nanocomposite material includes spherical metal oxide nanoparticles including a $ZrO_2$ phase and a $CaSiO_3$ phase dispersed on a matrix of $g-C_3N_4$ nanosheets, where the spherical metal oxide nanoparticles have an average particle diameter in a range from 3 nanometer (nm) to 18 nm. Still further, the hydrolyzing proceeds with a hydrogen generation rate of greater than or equal to 200 milliliters per minute per gram ($mL \cdot min^{-1} \cdot g^{-1}$).

In some embodiments, the hydrolyzing proceeds with a hydrogen generation rate of greater than or equal to 250 $mL \cdot min^{-1} \cdot g^{-1}$.

In some embodiments, the hydrolyzing proceeds with a hydrogen generation rate of greater than or equal to 300 $mL \cdot min^{-1} \cdot g^{-1}$.

In some embodiments, the hydrolyzing proceeds with a hydrogen generation rate of greater than or equal to 1400 $mL \cdot min^{-1} \cdot g^{-1}$.

In some embodiments, the hydrolyzing proceeds with a hydrogen generation rate of greater than or equal to 1500 $mL \cdot min^{-1} \cdot g^{-1}$.

In some embodiments, the hydrolyzing proceeds with a hydrogen generation rate of greater than or equal to 1600 $mL \cdot min^{-1} \cdot g^{-1}$.

In some embodiments, the hydrolyzing proceeds with a hydrogen generation rate of greater than or equal to 1650 $mL \cdot min^{-1} \cdot g^{-1}$.

In some embodiments, the hydrolyzing proceeds with a hydrogen generation rate of greater than or equal to 1675 $mL \cdot min^{-1} \cdot g^{-1}$.

In some embodiments, the hydrolyzing proceeds with a hydrogen generation rate of 310 $mL \cdot min^{-1} \cdot g^{-1}$ at 28 degree Celsius (° C.).

In some embodiments, the hydrolyzing proceeds with a hydrogen generation rate of 1685 $mL \cdot min^{-1} \cdot g^{-1}$ at 38° C.

In some embodiments, the spherical metal oxide nanoparticles have an average particle diameter in a range from 5 nm to 12 nm.

In some embodiments, the spherical metal oxide nanoparticles have an average particle diameter in a range from 7 to 10 nm.

In some embodiments, the spherical metal oxide nanoparticles have an average particle diameter of 8.5 nm.

In some embodiments, the $ZrO_2/CaSiO_3/g\text{-}C_3N_4$ nanocomposite material has a brunauer-emmett-teller (BET) surface area greater than or equal to 55 square meter per gram ($m^2 \cdot g^{-1}$).

In some embodiments, the $ZrO_2/CaSiO_3/g\text{-}C_3N_4$ nanocomposite material has a BET surface area greater than or equal to 60 $m^2 \cdot g^{-1}$.

In some embodiments, the $ZrO_2/CaSiO_3/g\text{-}C_3N_4$ nanocomposite material has a BET surface area greater than or equal to 65 $m^2 \cdot g^{-1}$.

In some embodiments, the $ZrO_2/CaSiO_3/g\text{-}C_3N_4$ nanocomposite material has a pore volume greater than or equal to 0.15 cubic centimeter per gram ($cm^3 \cdot g^{-1}$).

In some embodiments, the $ZrO_2/CaSiO_3/g\text{-}C_3N_4$ nanocomposite material has a pore volume greater than or equal to 0.20 $cm^3 \cdot g^{-1}$.

In some embodiments, the $ZrO_2/CaSiO_3/g\text{-}C_3N_4$ nanocomposite material has a pore volume greater than or equal to 0.25 $cm^3 \cdot g^{-1}$.

In some embodiments, the $ZrO_2/CaSiO_3/g\text{-}C_3N_4$ nanocomposite material has a trimodal pore size distribution with average pore diameters maximized at 6.2 nm, 9.53 nm, and 17.2 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
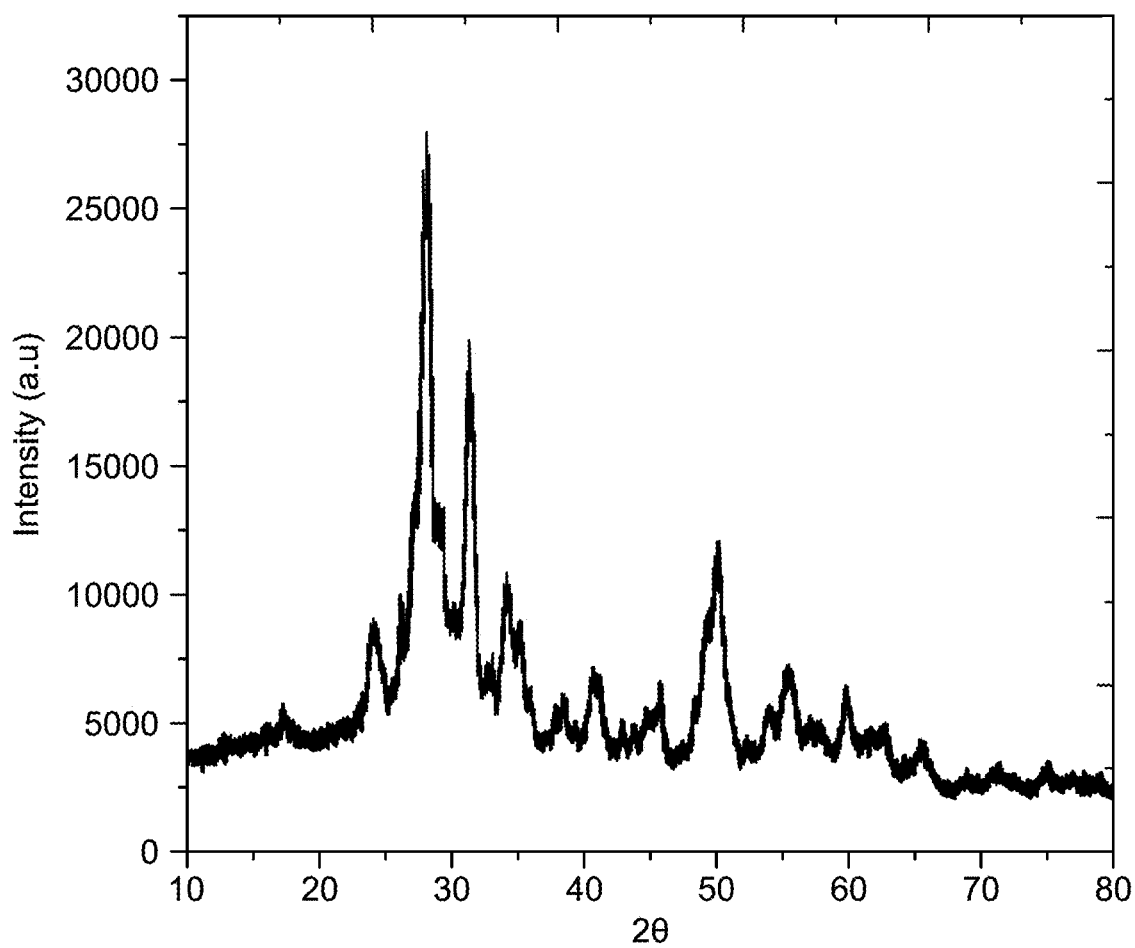
FIG. 1 depicts an X-ray diffractogram (XRD) of zirconium dioxide/calcium silicate/graphitic carbon nitride ($ZrO_2/CaSiO_3$@ $g\text{-}C_3N_4$) nanocomposite catalyst, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

A weight percent of a component, unless specifically stated to the contrary, is based on the total weight of the nanocomposite in which the component is included. For example, if a particular element or component in the nanocomposite is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a $ZrO_2/CaSiO_3/g\text{-}C_3N_4$ nanocomposite material, also referred to as the nanocomposite material or $ZrO_2/CaSiO_3$@$g\text{-}C_3N_4$ nanocomposite, designed to function as a catalyst to enhance the hydrolysis of sodium borohydride ($NaBH_4$) for efficient production of hydrogen gas. The catalyst facilitates the safe and rapid release of hydrogen from $NaBH_4$, making it an efficient solution for clean hydrogen production. The present disclosure circumvents the drawbacks of prior art by addressing limitations such as high catalyst costs, slow reaction rates, and environmental concerns. Traditional catalysts often require expensive materials, resulting in inefficient or slow hydrogen production. In contrast, the present disclosure uses a cost-effective catalyst that promotes faster hydrogen generation without relying on toxic or scarce materials. The simplicity of its preparation and its high catalytic activity also provides scalability and practical applicability, making it a more efficient and sustainable alternative to existing methods.

A nanocomposite material is described. The nanocomposite material includes $ZrO_2/CaSiO_3/g-C_3N_4$.

In one or more embodiments, the $ZrO_2/CaSiO_3/g-C_3N_4$ nanocomposite material has a $ZrO_2$ content in a range from 28 to 38 weight % (wt. %), a $CaSiO_3$ content in a range from 28 to 38 wt. %, and a $g-C_3N_4$ content in a range from 28 to 38 wt. %.

In some embodiments, the $ZrO_2/CaSiO_3/g-C_3N_4$ nanocomposite material is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, a Brunauer-Emmett-Teller (BET) surface area of the $ZrO_2/CaSiO_3/g-C_3N_4$ nanocomposite material greater than or equal to 45 $m^2 \cdot g^{-1}$, preferably 55 $m^2 \cdot g^{-1}$, preferably greater than or equal to 60 $m^2 \cdot g^{-1}$, preferably greater than or equal to 65 $m^2 \cdot g^{-1}$. In a specific embodiment, the BET surface area of the $ZrO_2/CaSiO_3/g-C_3N_4$ nanocomposite material is about 66.5 $m^2 \cdot g^{-1}$. The BET hypothesis is the foundation for an analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanocomposite may include, but is not limited to, crystalline average pore distribution, bimodal, trimodal, multimodal, narrow, broad, and Gaussian. In a preferred embodiment, the average pore distribution of nanocomposite is trimodal, indicating three pore sizes within the material.

In some embodiments, the $ZrO_2/CaSiO_3/g-C_3N_4$ nanocomposite material has a trimodal pore size distribution with average pore diameters maximized at 6.2, 9.53, and 17.2 nm, according to Barrett-Joyner-Halenda (BJH) measurement method.

In some embodiments, the $ZrO_2/CaSiO_3/g-C_3N_4$ nanocomposite material has a pore volume greater than or equal to 0.05 $cm^3 \cdot g^{-1}$, preferably 0.15 $cm^3 \cdot g^{-1}$, preferably greater than or equal to 0.20 $cm^3 \cdot g^{-1}$, preferably greater than or equal to 0.25 $cm^3 \cdot g^{-1}$. In a specific embodiment, the $ZrO_2/CaSiO_3/g-C_3N_4$ nanocomposite material has a pore volume of about 0.26 $cm^3 \cdot g^{-1}$.

The $ZrO_2/CaSiO_3/g-C_3N_4$ nanocomposite material includes spherical metal oxide nanoparticles including a $ZrO_2$ phase and a $CaSiO_3$ phase dispersed on a matrix of $g-C_3N_4$ nanosheets. The spherical metal oxide nanoparticles have an average particle diameter in a range from 0.5 to 50 nm, preferably 3 to 18 nm, preferably 4 to 15 nm, preferably 5 to 12 nm, preferably 7 to 10 nm, and more preferably about 8 to 9 nm. In a preferred embodiment, the spherical metal oxide nanoparticles have an average particle diameter of about 8.5 nm.

In some embodiments, in the $ZrO_2/CaSiO_3/g-C_3N_4$ nanocomposite material may exist in various morphological shapes such as nanosheets, nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures. In a preferred embodiment, the nanocomposite has a morphology including $ZrO_2$ and $CaSiO_3$ spherical metal oxide nanoparticles dispersed on $g-C_3N_4$ nanosheets.

In some embodiments, the $ZrO_2/CaSiO_3/g-C_3N_4$ nanocomposite material has crystalline content and includes a $ZrO_2$ phase, a $CaSiO_3$ phase, and $g-C_3N_4$. $ZrO_2$ may exist in various crystalline phases, such as monoclinic, tetragonal, and cubic, although in a preferred embodiment, the dominant phase is monoclinic phase.

A method of hydrogen generation from sodium borohydride ($NaBH_4$) is described. The method includes contacting $NaBH_4$ in the presence of the $ZrO_2/CaSiO_3/g-C_3N_4$ nanocomposite material, at a temperature in a range of from 120 to 250° C., preferably 150 to 200° C., preferably 160 to 190° C., preferably 170 to 180° C., preferably 180° C., wherein the $NaBH_4$ reacts with water to form $H_2$ gas in the presence of the $ZrO_2/CaSiO_3/g-C_3N_4$ nanocomposite material as a catalyst.

In some embodiments, the method of contacting sodium borohydride with the $ZrO_2/CaSiO_3/g-C_3N_4$ nanocomposite material is performed at a temperature range of 120 to 250° C., preferably 150 to 200° C., preferably 160 to 190° C., preferably 170 to 180° C., preferably 180° C. and a pressure of 1 to 10 bar, preferably 2 to 9 bar, preferably 3 to 8 bar, preferably 4 to 7 bar, preferably 5 to 6 bar, preferably 5 bar, for 1 to 3 hours, preferably 1 to 2 hours, preferably 1 hour.

In some embodiments, other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof may also be used.

In some embodiments, the hydrogen is generated at a hydrogen generation rate of greater than or equal to 100 $mL \cdot min^{-1} \cdot g^{-1}$, preferably greater 200 $mL \cdot min^{-1} \cdot g^{-1}$, preferably greater than or equal to 250 $mL \cdot min^{-1} \cdot g^{-1}$, preferably greater than or equal to 300 $mL \cdot min^{-1} \cdot g^{-1}$, preferably greater than or equal to 400 mL·min$^{-1}$·g$^{-1}$, preferably greater than or equal to 500 mL·min$^{-1}$·g$^{-1}$, preferably greater than or equal to 600 mL·min$^{-1}$·g$^{-1}$, preferably greater than or equal to 700 mL·min$^{-1}$·g$^{-1}$, preferably greater than or equal to 800 mL·min$^{-1}$·g$^{-1}$, preferably greater than or equal to 900 mL·min$^{-1}$·g$^{-1}$, preferably greater than or equal to 1000 mL·min$^{-1}$·g$^{-1}$, preferably greater than or equal to 1100 mL·min$^{-1}$·g$^{-1}$, preferably greater than or equal to 1200 mL·min$^{-1}$·g$^{-1}$, preferably greater than or equal to 1300 mL·min$^{-1}$·g$^{-1}$, preferably greater than or equal to 1400 mL·min$^{-1}$·g$^{-1}$, preferably greater than or equal to 1500 mL·min$^{-1}$·g$^{-1}$, preferably greater than or equal to 1600 mL·min$^{-1}$·g$^{-1}$, preferably greater than or equal to 1650 mL·min$^{-1}$·g$^{-1}$, preferably greater than or equal to 1675 mL·min$^{-1}$·g$^{-1}$. In a specific embodiment, the hydrogen is generated at a hydrogen generation rate of 310 mL·min$^{-1}$·g$^{-1}$ at 28° C. In another specific embodiment, the hydrogen is generated at a hydrogen generation rate of 1685 mL·min$^{-1}$·g$^{-1}$ at 38° C.

The following examples are provided solely for illustration and are not to be construed as limitations of the present disclosure, as many variations thereof are possible without departing from the spirit and scope of the present disclosure.

EXAMPLES

The following examples demonstrate zirconium dioxide/calcium silicate/graphitic carbon nitride ($ZrO_2$/$CaSiO_3$/g-$C_3N_4$) based nanocomposite as described herein. The examples are provided solely for illustration and are not to be construed as limitations of the present disclosure, as many variations thereof are possible without departing from the spirit and scope of the present disclosure.

Example 1: Fabricating the $CaSiO_3$

Equal moles of calcium nitrate (0.5 g) and sodium metasilicate (0.37 g) were dispersed in 100 milliliters (mL) of ethanol: water (1:1) in a 150 mL glass beaker and sonicated for 15 minutes. The mixture was transferred to a 200 mL autoclave and then placed in an oven operated at 180° C. for 2 hours. The product was dispersed in 500 mL distilled water with an ultrasonic bath for 10 minutes, filtered via a Buchner system, rinsed with distilled water, and dried at 120° C. for 1 hour.

Example 2: Fabricating the g-$C_3N_4$

About 30 grams (g) of urea was placed in a 250 mL porcelain crucible, covered with its porcelain cover, then the crucible and cover were wrapped with three layers of aluminum foil to reduce the urea loss to sublimation. The crucible was heated via a furnace set at 600° C. for 45 minutes.

Example 3: Fabricating the $ZrO_2$

About 10 g zirconium oxychloride octahydrate and 10 g of xylose were placed in a 500 mL beaker. 100 mL distilled water was added to the mixture and heated till a clear solution was obtained. 10 mL of concentrated nitric acid was added to the mixture, which was then at 200° C. heated until the carbonization of xylose. The mixture was placed in an oven set at 200° C. for 3 hours, the black product was milled in a mortar, placed in a 150 mL porcelain dish, and calcined at 550° C. for 4 hours.

Example 4: Fabricating the $ZrO_2$/$CaSiO_3$@g-$C_3N_4$

An equal amount of $CaSiO_3$, g-$C_3N_4$, and $ZrO_2$ (0.5 grams each) was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5 bar pressure for one hour. The product was dispersed in 1 litre (L) distilled water with an ultrasonic bath for 30 minutes, filtered via a Buchner system, rinsed with distilled water, and dried at 150° C. for 2 hours.

Example 5: Characterization

X-ray diffraction (XRD) was used to examine the crystallinity and phase identification of the $ZrO_2$/$CaSiO_3$/g-$C_3N_4$ catalyst; the findings are shown in FIG. 1 The high crystalline nature of the powder is shown by its sharp peaks and high-intensity values. $ZrO_2$ is present as a primary phase, and $CaSiO_3$ and g-$C_3N_4$ are minor phases, according to an analysis of the diffraction patterns using standard PDF cards. The 2θ values of 23.9°, 28.0°, 31.3°, 33.9°, and 49.9° were used to index the $ZrO_2$ monoclinic phase. (011), (−11), (111), (002), and (220) planes of the monoclinic phase of $ZrO_2$ are ascribed to the diffractions, respectively (Reference code No. 01-074-0815). The 2θ values of 20.4°, 26.8°, 28.9°, 30.2°, and 50.1° values were used to detect the $CaSiO_3$ phase (Reference code 01-072-2297). These diffractions originated from (21-1), (20-2), (202), (320), and (040), in that order. The g-$C_3N_4$ diffractions were recorded at 28.5° and 47.5° (Reference code No. 01-072-0497), indicating that $ZrO_2$/$CaSiO_3$/g$C_3N_4$ was successfully fabricated since no further phases were found.

Figure 2A:
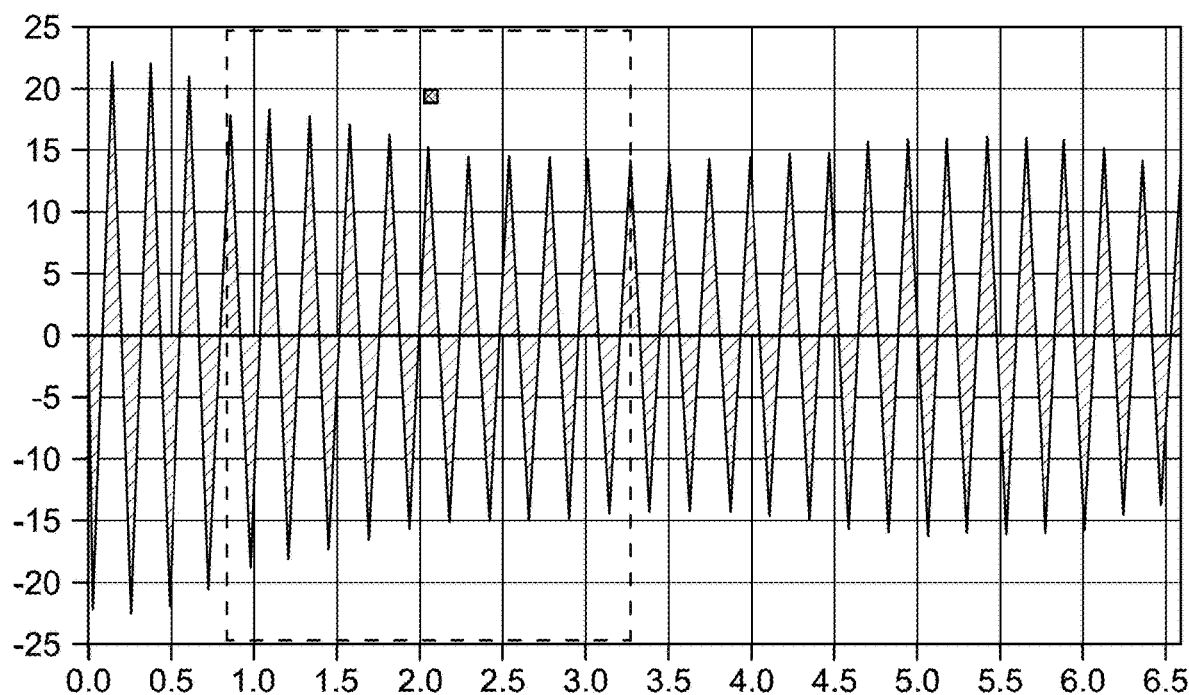
FIG. 2A depicts an inverse fast fourier transform (IFFT) graph of $ZrO_2/CaSiO_3$@$g\text{-}C_3N_4$ nanocomposite, according to certain embodiments.
Figure 2B:
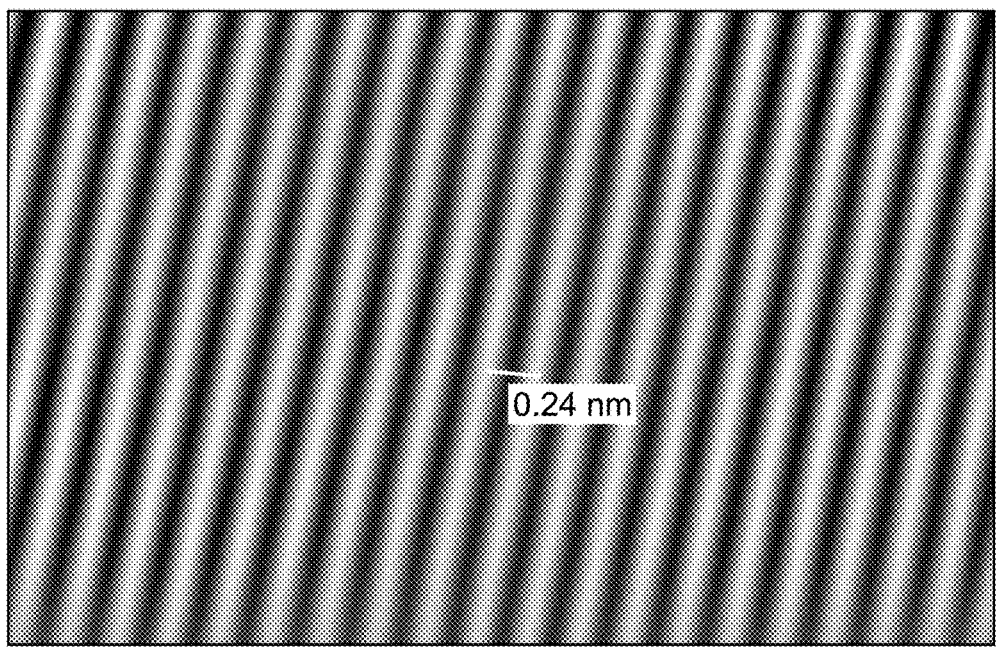
FIG. 2B depicts a fast fourier transform (FFT) graph of $ZrO_2/CaSiO_3$@$g\text{-}C_3N_4$ nanocomposite, according to certain embodiments.
Figure 2C:
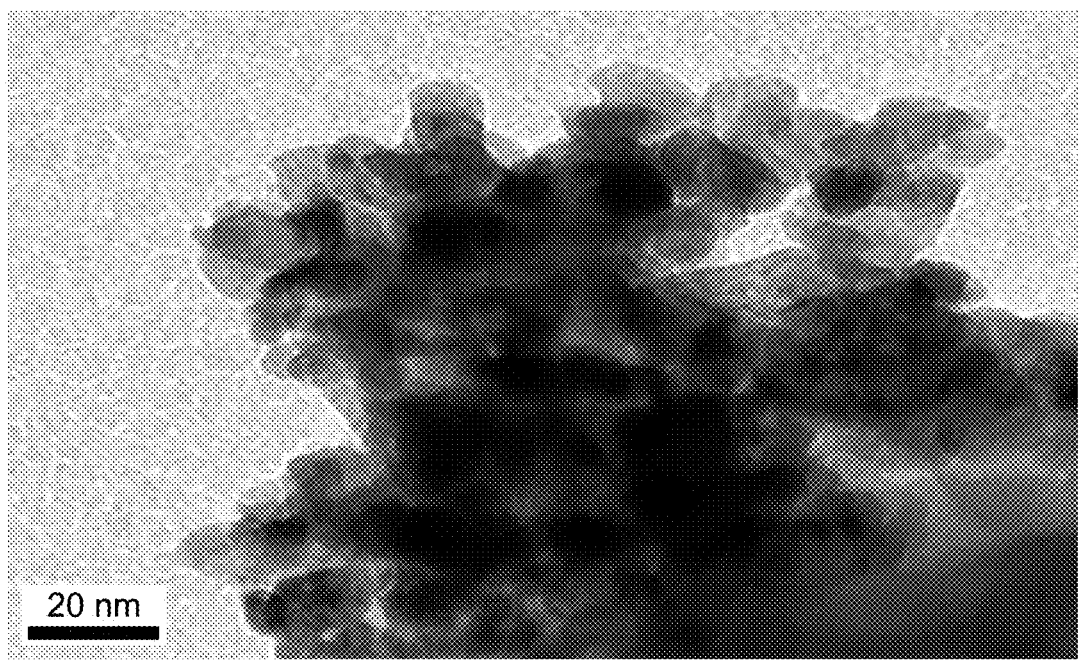
FIG. 2C depicts a transmission electron microscope (TEM) image of $ZrO_2/CaSiO_3$@$g\text{-}C_3N_4$ nanocomposite, according to certain embodiments.
Figure 2D:
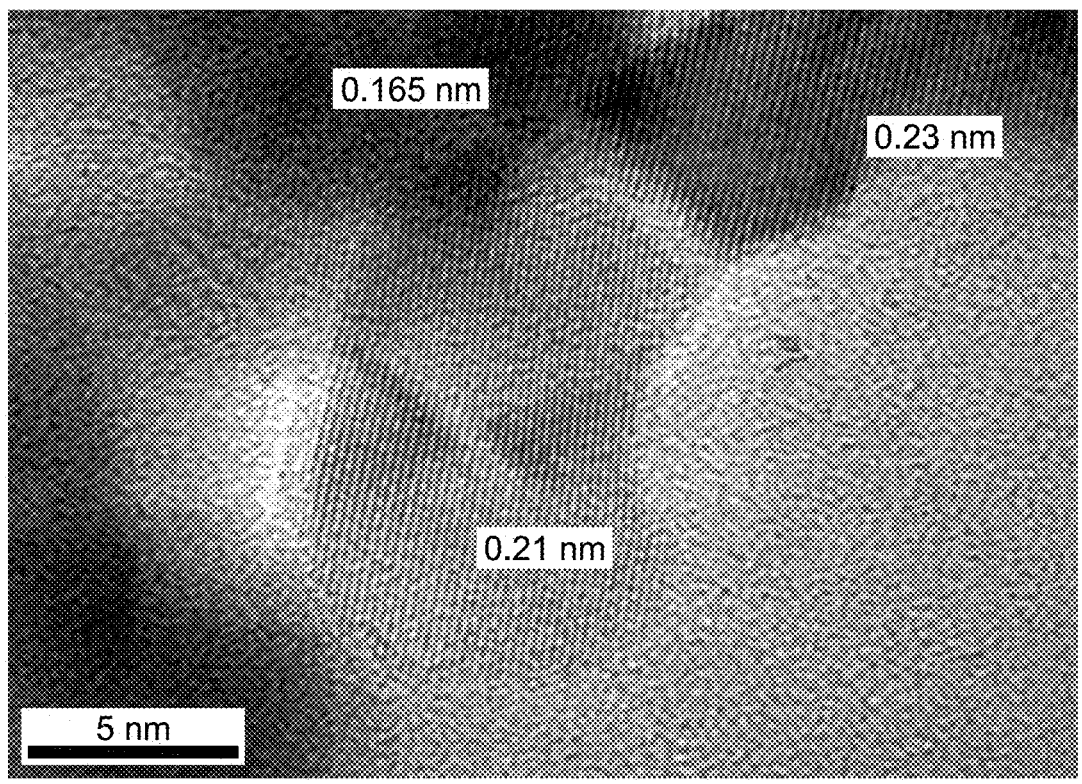
FIG. 2D depicts a TEM image of $ZrO_2/CaSiO_3$@$g\text{-}C_3N_4$ nanocomposite, according to certain embodiments.
Figure 2E:
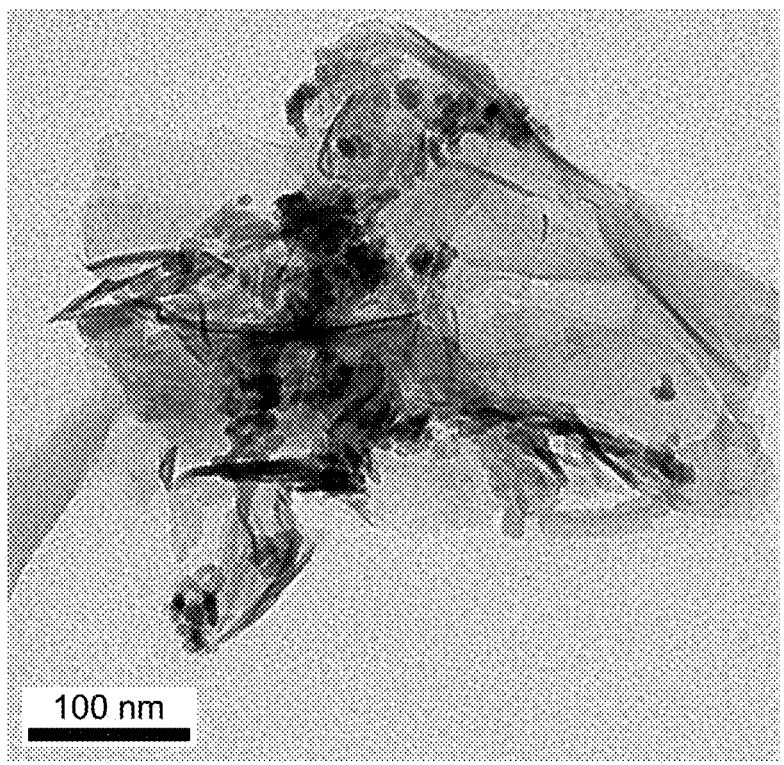
FIG. 2E depicts a high-resolution transmission electron microscopy (HRTEM) image of $ZrO_2/CaSiO_3$@$g\text{-}C_3N_4$ nanocomposite, according to certain embodiments.
Figure 2F:
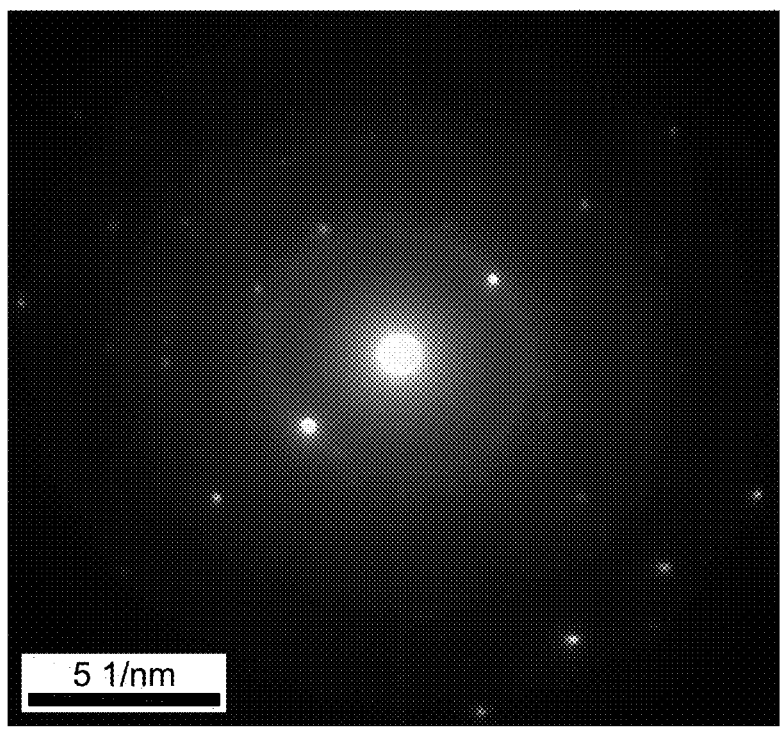
FIG. 2F depicts a selected area electron diffraction (SAED) pattern image of $ZrO_2/CaSiO_3$@$g\text{-}C_3N_4$ nanocomposite, according to certain embodiments.

Transmission electron microscopy (TEM) images of $ZrO_2$/$CaSiO_3$@g-$C_3N_4$ nanocomposite were presented in FIGS. 2C-2D. The TEM images showed a two-dimensional porous structure constructed with curled and wrinkled nanosheets and platelets of the g-$C_3N_4$, as shown in FIGS. 2C-2D. The image also shows well dispersion of homogeneous spherical metal oxides nanoparticles with size 8.5 nanometer (nm) on nanosheets of g-$C_3N_4$. The corresponding selected area electron diffraction (SAED) pattern reveals diffraction spots with interplanar spacing of 0.31 nm, 0.154 nm, and 0.13 nm due to ($CaSiO_3$: 202, $ZrO_2$: −111), ($ZrO_2$: −302, $C_3N_4$: 331, $CaSiO_3$: 54-1) and ($CaSiO_3$: 33-4, $ZrO_2$: 123), diffraction planes, as shown in FIG. 2F. The corresponding high-resolution transmission electron microscopy (HRTEM) of the composite shows a plane spacing of 0.23 nm related to the (002) of CN, where 0.165 nm and 0.21 nm are related respectively to the ($CaSiO_3$: 40-4, $ZrO_2$: −113) and ($CaSiO_3$: 512, $ZrO_2$: −112) planes, characterizing the heterostructure formation, as shown in FIG. 2E. The fast fourier transform (FFT) and inverse fast fourier transform (IFFT) measurements show a d value of 0.24 nm given to $ZrO_2$/$CaSiO_3$@g-$C_3N_4$ nanocomposite, signifying the lattice spacing of ($C_3N_4$: 220), indicating the development of g-$C_3N_4$ structure, as shown in FIGS. 2A-2B, respectively.

Figure 3A:
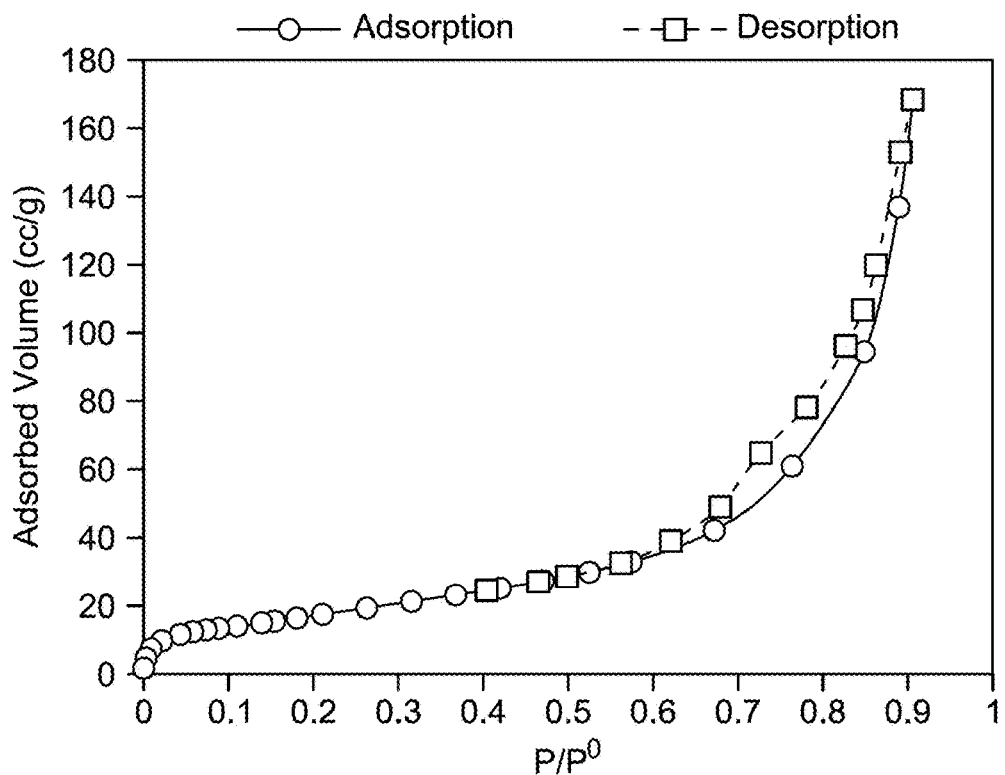
FIG. 3A depicts an adsorption-desorption isotherms of $ZrO_2/CaSiO_3$@$g\text{-}C_3N_4$ nanocomposite, according to certain embodiments.
Figure 3B:
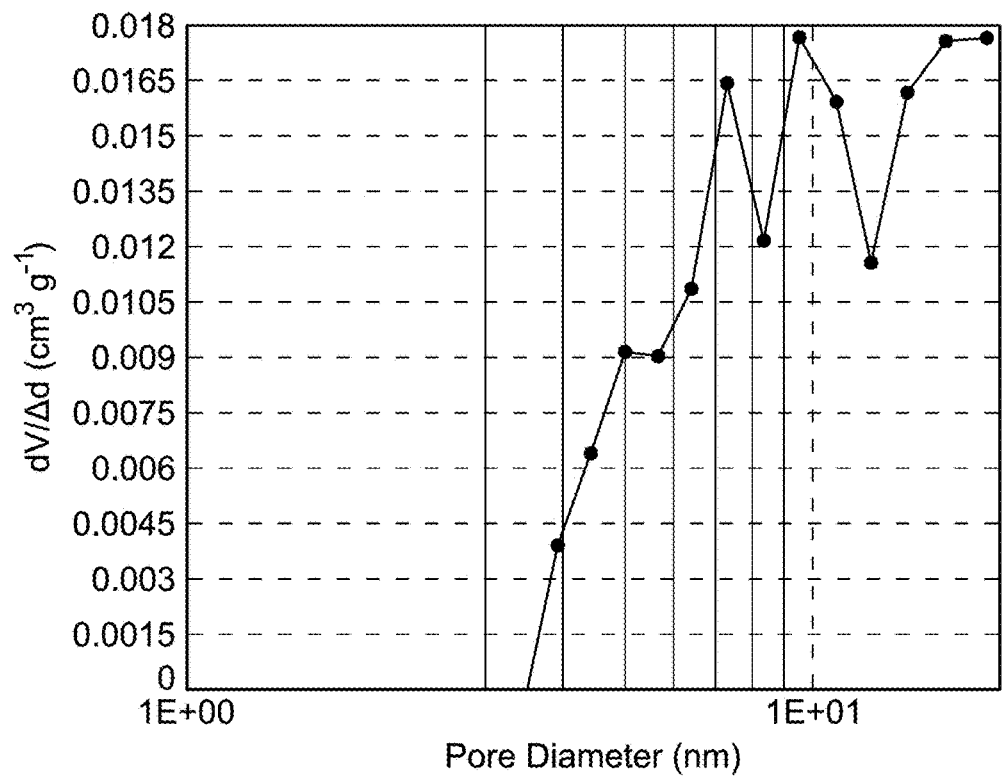
FIG. 3B depicts a pore size distribution curve of $ZrO_2/CaSiO_3$@$g\text{-}C_3N_4$ nanocomposite, according to certain embodiments.

FIG. 3A & FIG. 3B displays the nitrogen adsorption-desorption isotherms of $ZrO_2$/$CaSiO_3$@g-$C_3N_4$ nanocomposite. The nitrogen sorption isotherm of the composite belongs to type IV with a narrow hysteresis loop, indicating the formation of mesoporous structures. However, shifting the loop to a relatively higher pressure (P/P0=0.58-1) indicates the presence of wide mesopores, which may result from the deposition of metal oxide particles in the wide pores of g-$C_3N_4$. Furthermore, the Brunauer-Emmett-Teller (BET) surface area of the $ZrO_2$/$CaSiO_3$@g-$C_3N_4$ sample was calculated to be 66.5 square meter per gram ($m^2\ g^{-1}$). The marked high specific surface area reflects the good dispersion of the metal oxide nanoparticles on g-$C_3N_4$. and $CaSiO_3$. Moreover, the pore size distribution curves, plotted using the Barrett-Joyner-Halenda (BJH) method, for the $ZrO_2/CaSiO_3$@g-$C_3N_4$ sample exhibited trimodal distribution with average pore diameters maximized at 6.2 nm, 9.53 nm, and 17.2 nm and pore volume of 0.26 cubic centimeter per gram ($cm^3\ g^{-1}$), as shown in FIG. 3B. All the isotherms belong to the category $H_3$ type of pores, which do not exhibit limiting adsorption at high P/P° and arise due to aggregation of plate-like particles, giving rise to slit-shaped pores. This indicates that the $ZrO_2/CaSiO_3$ @CN composite assembly provoked a mesoporous array.

Example 6: Generating Hydrogen ($H_2$) from the Hydrolysis of Sodium Borohydride (Na $BH_4$)

Figure 4:
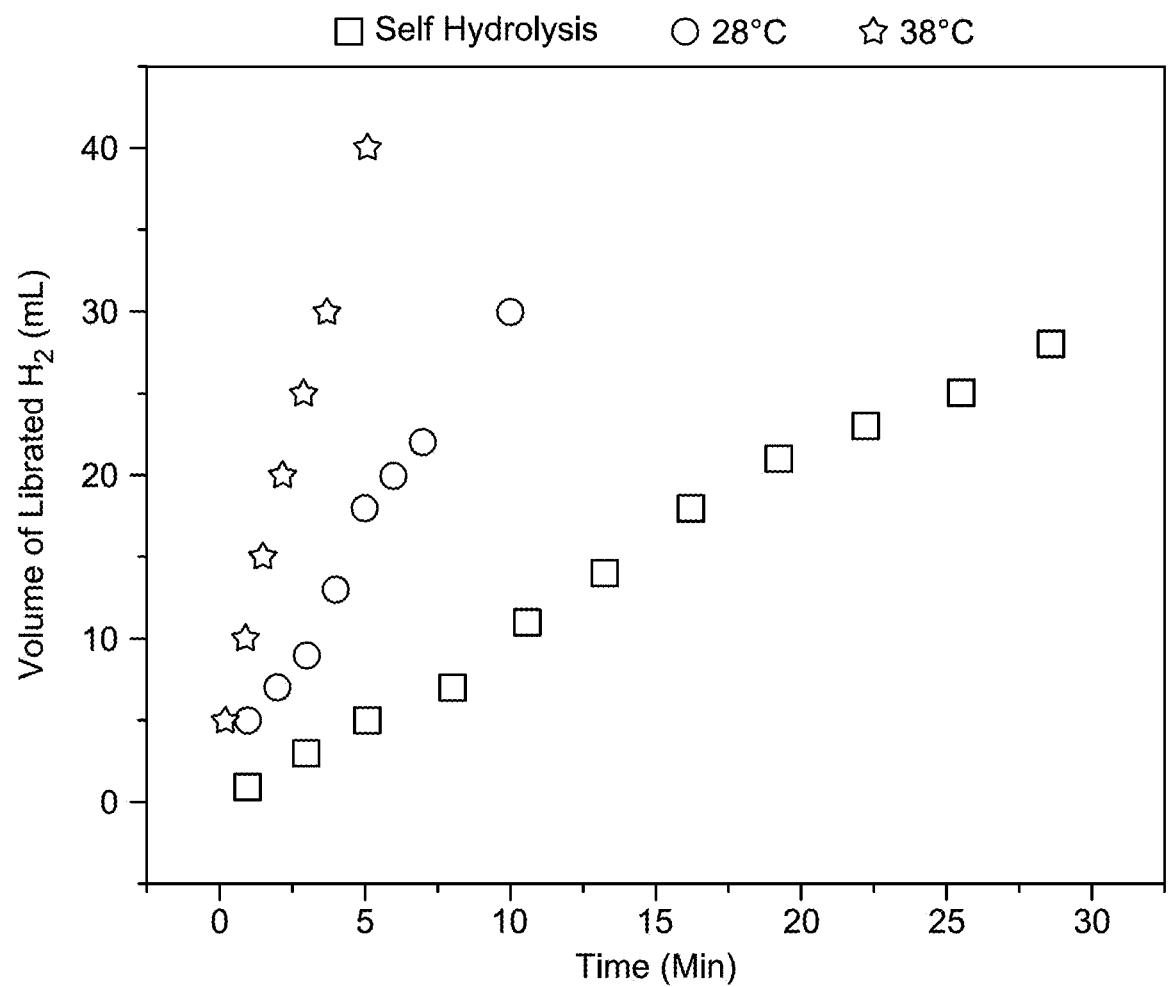
FIG. 4 depicts the volume of liberated $H_2$ with reaction time over $ZrO_2/CaSiO_3$@$g\text{-}C_3N_4$ nanocomposite, according to certain embodiments.

The results of hydrolysis of $NaBH_4$ with and without $ZrO_2/CaSiO_3$@g-$C_3N_4$ nanocomposite catalyst are shown in FIG. 4. The catalytic action of the $ZrO_2/CaSiO_3$@g-$C_3N_4$ nanocomposite was observed, and the catalytic reaction exhibited catalytic activity higher than the self-hydrolysis process. According to the data analysis, $H_2$ gas volume rises gradually over time. In addition, the catalytic hydrolysis reaction increases with the increase in reaction temperature. Results demonstrate that on using 0.7 g of $NaBH_4$, values of hydrogen generation rate (HGR) of 310.0 milliliter per minute per gram (mL $min^{-1}\ g^{-1}$)—and 1685.0 mL $min^{-1}\ g^{-1}$ were obtained at reaction temperatures of 28° C. and 38° C., respectively.

In the present disclosure, $ZrO_2/CaSiO_3$@g-$C_3N_4$ nanocomposite was fabricated by a facile and low-cost method. The synthesized catalyst was characterized by XRD, TEM, and BET. XRD confirmed the successful fabrication of $ZrO_2/CaSiO_3$@g-$C_3N_4$ nanocomposite. Further, the disclosure was focused on the fabrication of the $ZrO_2/CaSiO_3$@g-$C_3N_4$ nanocomposite and the generation of $H_2$ as a fuel with the highest hydrogen generation rate (HGR). The catalytic activity revealed that the fabricated catalyst may hydrolyze the $NaBH_4$ with a hydrogen generation rates (HGR) of 310.0 mL $min^{-1}\ g^{-1}$ and 1685.0 mL $min^{-1}\ g^{-1}$ at reaction temperatures of 28° C. and 38° C., respectively. Still further, it may be stated that by using the above-identified nanocatalyst $H_2$ production may be achieved.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of hydrogen generation from $NaBH_4$, comprising:
   hydrolyzing $NaBH_4$ in the presence of a $ZrO_2/CaSiO_3$/g-$C_3N_4$ nanocomposite material;
   wherein the $NaBH_4$ reacts with water to form $H_2$ gas in the presence of the $ZrO_2/CaSiO_3$/g-$C_3N_4$ nanocomposite material as a catalyst;
   wherein the $ZrO_2/CaSiO_3$/g-$C_3N_4$ nanocomposite material comprises spherical metal oxide nanoparticles comprising a $ZrO_2$ phase and a $CaSiO_3$ phase dispersed on a matrix of g-$C_3N_4$ nanosheets,
   wherein the spherical metal oxide nanoparticles have an average particle diameter in a range from 3 to 18 nm, and
   wherein the hydrolyzing proceeds with a hydrogen generation rate of greater than or equal to 200 mL·$min^{-1}$·$g^{-1}$.

2. The method of claim 1, wherein the hydrolyzing proceeds with a hydrogen generation rate of greater than or equal to 250 mL·$min^{-1}$·$g^{-1}$.

3. The method of claim 2, wherein the hydrolyzing proceeds with a hydrogen generation rate of greater than or equal to 300 mL·$min^{-1}$·$g^{-1}$.

4. The method of claim 1, wherein the hydrolyzing proceeds with a hydrogen generation rate of greater than or equal to 1400 mL·$min^{-1}$·$g^{-1}$.

5. The method of claim 4, wherein the hydrolyzing proceeds with a hydrogen generation rate of greater than or equal to 1500 mL·$min^{-1}$·$g^{-1}$.

6. The method of claim 5, wherein the hydrolyzing proceeds with a hydrogen generation rate of greater than or equal to 1600 mL·$min^{-1}$·$g^{-1}$.

7. The method of claim 6, wherein the hydrolyzing proceeds with a hydrogen generation rate of greater than or equal to 1650 mL·$min^{-1}$·$g^{-1}$.

8. The method of claim 7, wherein the hydrolyzing proceeds with a hydrogen generation rate of greater than or equal to 1675 mL·$min^{-1}$·$g^{-1}$.

9. The method of claim 1, wherein the hydrolyzing proceeds with a hydrogen generation rate of 310 mL·$min^{-1}$·$g^{-1}$ at 28° C.

10. The method of claim 1, wherein the hydrolyzing proceeds with a hydrogen generation rate of 1685 mL·$min^{-1}$·$g^{-1}$ at 38° C.

11. The method of claim 1, wherein the spherical metal oxide nanoparticles have an average particle diameter in a range from 5 to 12 nm.

12. The method of claim 11, wherein the spherical metal oxide nanoparticles have an average particle diameter in a range from 7 to 10 nm.

13. The method of claim 12, wherein the spherical metal oxide nanoparticles have an average particle diameter of 8.5 nm.

14. The method of claim 1, wherein the $ZrO_2/CaSiO_3$/g-$C_3N_4$ nanocomposite material has a BET surface area greater than or equal to 55 $m^2$·$g^{-1}$.

15. The method of claim 14, wherein the $ZrO_2/CaSiO_3$/g-$C_3N_4$ nanocomposite material has a BET surface area greater than or equal to 60 $m^2$·$g^{-1}$.

16. The method of claim 15, wherein the $ZrO_2/CaSiO_3$/g-$C_3N_4$ nanocomposite material has a BET surface area greater than or equal to 65 $m^2$·$g^{-1}$.

17. The method of claim 1, wherein the $ZrO_2/CaSiO_3$/g-$C_3N_4$ nanocomposite material has a pore volume greater than or equal to 0.15 $cm^3$·$g^{-1}$.

18. The method of claim 17, wherein the $ZrO_2/CaSiO_3$/g-$C_3N_4$ nanocomposite material has a pore volume greater than or equal to 0.20 $cm^3$·$g^{-1}$.

19. The method of claim 18, wherein the $ZrO_2/CaSiO_3$/g-$C_3N_4$ nanocomposite material has a pore volume greater than or equal to 0.25 $cm^3$·$g^{-1}$.

20. The method of claim 1, wherein the $ZrO_2/CaSiO_3$/g-$C_3N_4$ nanocomposite material has a trimodal pore size distribution with average pore diameters maximized at 6.2, 9.53, and 17.2 nm.

* * * * *